United States Patent [19]
Getz, Jr.

[11] Patent Number: 5,012,566
[45] Date of Patent: May 7, 1991

[54] DRILLING AND EXPANDING TOOL FOR REMOVING CARBURETOR SEAL PLUGS

[76] Inventor: Carl R. Getz, Jr., RD #1, Box 397, Nanty Glo, Pa. 15943

[21] Appl. No.: 430,432

[22] Filed: Nov. 6, 1989

[51] Int. Cl.[5] ............................................ B23P 19/04
[52] U.S. Cl. ...................................... 29/265; 29/214; 29/221.6; 29/263; 29/402.2; 279/2 R; 408/1 R
[58] Field of Search .................... 29/26 A, 213.1, 214, 29/221.5, 221.6, 249, 256, 258, 259, 263, 265, 280, 401.1, 402.2, DIG. 67, 426.5; 408/10, 130, 1 R, 241 R; 279/2 R

[56] References Cited

U.S. PATENT DOCUMENTS

| | | | |
|---|---|---|---|
| 2,614,318 | 10/1952 | McCord | 29/263 |
| 4,100,663 | 7/1978 | Crum | 29/401.1 X |
| 4,104,775 | 8/1978 | Lawless | 29/265 |
| 4,280,274 | 7/1981 | Filer | 29/263 X |
| 4,516,787 | 5/1985 | Venable | 279/2 R X |
| 4,617,692 | 10/1986 | Bond et al. | 408/241 R X |
| 4,724,608 | 2/1988 | Parott | 29/263 X |

FOREIGN PATENT DOCUMENTS

| | | | |
|---|---|---|---|
| 844419 | 7/1939 | France | 29/263 |
| 7978 | of 1885 | United Kingdom | 29/263 |

*Primary Examiner*—Joseph M. Gorski
*Assistant Examiner*—Peter Dungba Vo
*Attorney, Agent, or Firm*—Harry Williams

[57] ABSTRACT

A tool for removing seal plugs from a carburetor baseplate having a shaft and collet arrangement in which the shaft is formed at one end by a drill bit. The members are concentrically aligned within an outer holder member which also functions as a drill guide when the shaft-drill member is connected to a drill chuck and the drill bit end of the shaft is presented to the face cap of the seal plug. Once the end cap is removed by the drill bit end of the shaft member, the tool is then inserted as a unit through the cylindrical space defining the seal plug, and the seal plug is then removed in the conventional manner from the borehole without damaging the borehole or the baseplate.

7 Claims, 1 Drawing Sheet

DRILLING AND EXPANDING TOOL FOR REMOVING CARBURETOR SEAL PLUGS

BACKGROUND OF THE INVENTION

This invention relates to automotive tools and particularly to tools used for dismantling and rebuilding carburetors. In the case of rebuilding a carburetor, it is necessary to remove or adjust the air-jet valves or idle-mixture screws in the course of replacing various other parts of the carburetor. The air-jet valves in most carburetors are protected by seal plugs which are normally force fitted into the channels or bores in which the air-jet valves are disposed. In the past these seal plugs have been removed by force, either by braking the cap and using pliers or some such other gripping device to pull the plug from its borehole. This primitive method, however, often results in failure because all that is accomplished is to remove the cap face without removing the cylindrical portion of the plug. In order to remove the plug itself, then, recourse is had to removing part of the baseplate of the carburetor, either by chipping or gouging, in order to expose an edge of the plug for subsequent gripping and removal. This last step, naturally, defaces the carburetor in the area of the boreholes for the air-jet valves. If the same carburetor baseplate is used again, as is often the case, for housing new valves and new seal plugs, a defective carburetor is reinstalled in the IC engine, a carburetor which has not only been weakened by the removed portions in the baseplate but will not meet Federal and State law emissions standards.

Yet another method for removing the seal plugs from the baseplate of a carburetor attempts to remove a portion of the face cap of the seal plug, either by drilling a small hole or by punching a hole therein, and then inserting a tool which grips the remaining portions of the end cap as well as an interior surface of the plug. The plug is then removed manually or by means of a slide hammer. This method, however, fails to remove difficult-to-remove seal plugs without damaging the seal plug further, which also results in damaging the borehole of the baseplate and thus the baseplate itself, defeating, then, the enterprise of rebuilding the carburetor.

OBJECTS AND SUMMARY OF THE INVENTION

It is a primary purpose and principle object of the present invention to provide to overcome the aforementioned difficulties of removing a seal plug from a carburetor baseplate. The apparatus and method according to the present invention serves to remove seal plugs from the boreholes of a carburetor baseplate easily and efficiently without damaging the baseplate and without damaging the seal plugs other than removing the end cap. Thus, the plug itself is kept in tack during its removal from the borehole in the baseplate, and the baseplate is then protected from damage of any kind and can thus be used as part of the rebuilt carburetor.

According to one embodiment of the present invention, there is provided a tool having a shaft and collet arrangement in which the shaft is formed at one end by a frusto-conical member having a flat drill surface incorporated therein. The other end of the drill-shaft member is adapted to be gripped by a conventional drill chuck. The shaft and collet members are concentrically aligned within an outer holder member and all three members are free to rotate with respect to one another. Among other functions relating to the removal of the seal plug, the outer holder member also functions as a drill guide when the shaft-drill member is connected to a drill chuck and the drill bit end of the shaft is presented to the surface of the face cap of the seal plug. Once the end cap is removed by the drilling action of the drill bit end of the shaft member, the air-jet valve is removed by conventional means, as by an appropriate socket device, from the borehole in the carburetor baseplate. The tool, consisting of the concentrically arranged shaft and collet members, is then inserted as a unit through the cylindrical space defining the seal plug, and the plug is removed in accordance with conventional practice for removing bushings from boreholes. Specifically, by means of a small nut threaded onto the shank of the shaft member that coacts with one end of the collet member, the shaft member can be pulled into the interior space of the collet which has a slotted flanged rim portion that expands when the frusto-conical portion of the shaft engages the inner periphery of the flange or rim portion of the collet. Further turning of the nut presents the rim portion of the collet against the outside rear edge of the cylindrical seal plug. A large nut provided on a threaded portion of the collet and acting against the outer holder member, which is itself braced against the edge of the carburetor baseplate, allows the seal plug to be positively removed from the borehole into the cavity provided in the holder member without damaging the seal plug and without damaging the borehole or the baseplate.

The invention will be better understood as well as further objects and advantages thereof become more apparent from the ensuing detailed description taken in conjunction with the drawings.

DETAILED DESCRIPTION

Figure 1:
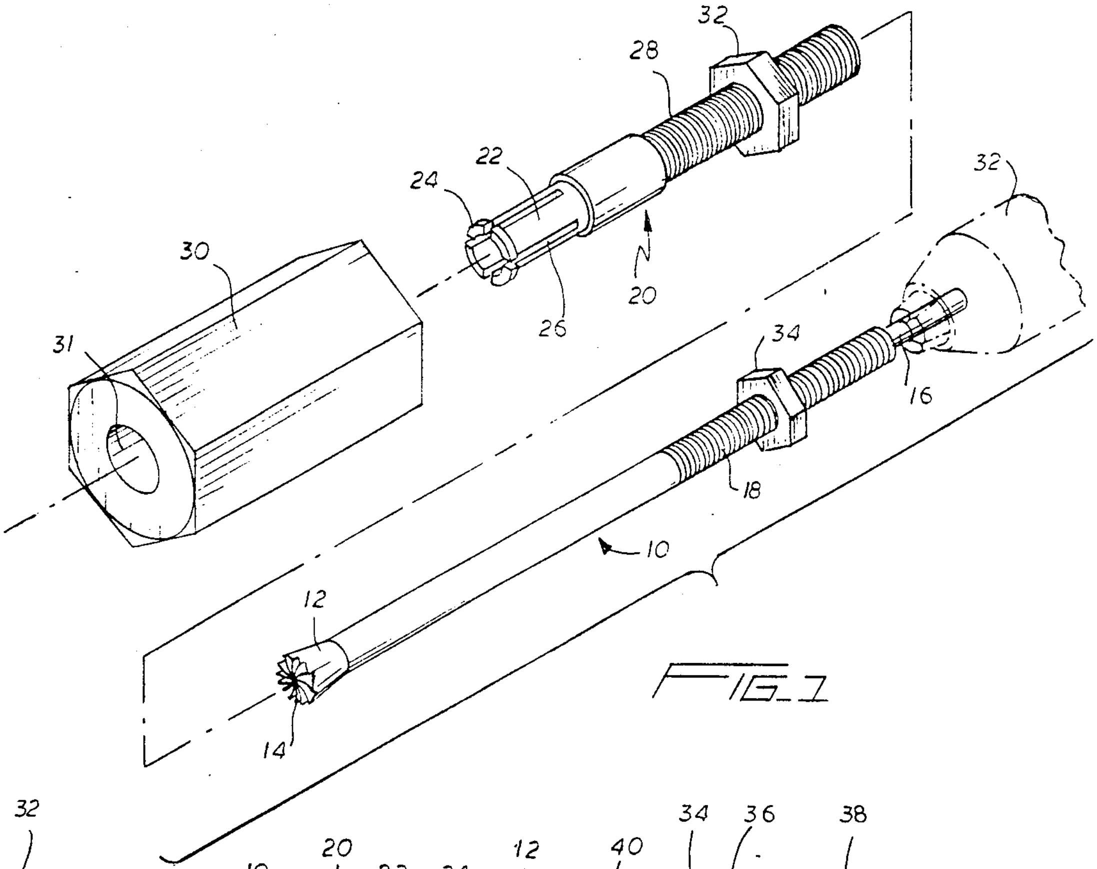
FIG. 1 is a schematic exploded perspective view of the carburetor tool according to the present invention.

Referring now to FIG. 1, there is shown a drill bit shaft member 10 of high tensile steel having an enlarged frusto-conical section 12 and a flat faced drill bit 14 formed on the end thereof for the purpose of removing the face of the end cap of the seal plug to be described more fully below. At the other end of the shaft 10 is smooth section 16 adapted to be gripped by a drill chuck (shown in dotted lines). The rear portion 18 of the shaft 10 is threaded for purposes to be explained below. As shown, the shaft 10 fits inside a collet member 20 also having a threaded portion 28, a front expansion portion 22 having a lip portion 24 and slots 26 therein to allow for the expansion. The collet member 20, in turn, fits within the central bore of a holder member 30 to be more fully explained below. Each of the aforementioned members, drill shaft member 10, collet member 20 and holder 30 are freely rotatable with respect to one another. Also shown, are bolts or nuts 32 and 43 disposed respectively on the collet member 20 and shaft member 10. It will be understood in accordance with conventional practice (as disclosed in U.S. Pat. No. 4,724,608) that when assembled in a concentric manner the tool as shown in FIG. 1 will allow the collet member 20 to move axially with respect to holder member 30 (when the latter is held stationary) and that shaft member 10 will move axially with respect to collet member 20 when that member is held stationary. The first-mentioned movement is effected by means of the bolt 32 being rotated on the threaded portion 28 against the end face of holder member 30, and the second-mentioned movement is effected by the bolt 34 being rotated on the threaded section 18 against the end face of section 28 of the collet member 20. This particular relationship of parts wherein one member is moved axially with respect to another is explained and disclosed in the aforementioned U.S patent and forms no part of the present invention.

Figure 2:
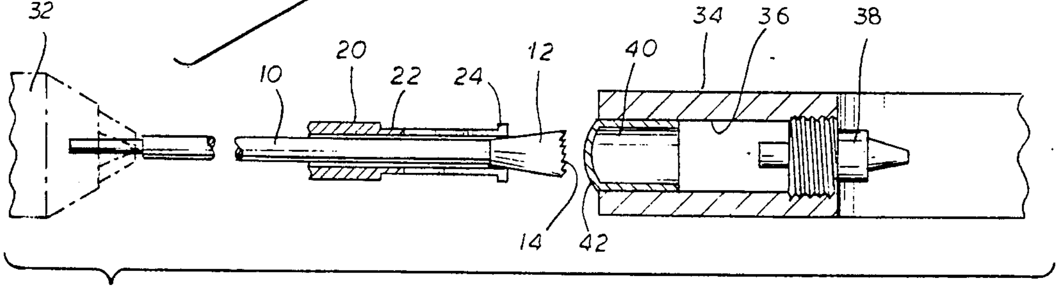
FIG. 2 is a schematic cross-sectional view of the tool according to the invention being used to drill the end cap of a seal plug in a carburetor baseplate.
Figure 3:
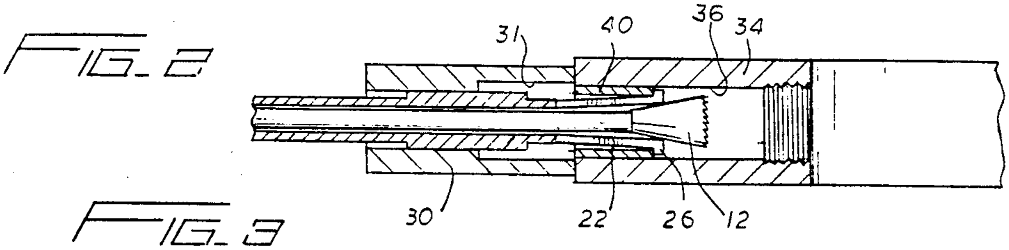
FIG. 3 is a schematic cross-sectional view of the tool in FIG. 2 being used to pull the seal plug from the carburetor baseplate.

The method of using the present invention is shown FIGS. 2 and 3. The end portion 16 of the drill bit shaft member 10 is gripped by a conventional drill chuck 32, and the drill bit end 14 is then presented against the face cap 42 of a seal plug member 40 forcefitted in the conventional manner within the borehole 36 of a conventional carburetor baseplate 34. It is to be noted that the diameter of the flat face of the drill bit 14 is no larger than the inside diameter of the seal plug 40. Also shown. is a conventional air-jet valve 38 which, during the course of rebuilding the associated carburetor (not shown), is to be removed and replaced or adjusted. While a flat-faced drill bit is shown for use with the invention, it is to be understood that a pointed drill bit face might also be used if there is enough clearance between the end of the seal plug 40 and the end of the air-jet valve 38 in the borehole. If it is determined that this space is too small to risk damaging the air-jet valve, then the flat-faced drill bit design as described above should be used.

In FIG. 3, the drill shaft is shown having penetrated the borehole 36 by drilling off the end face 40. The holder member 30 acts as drill guide and for this purpose is easily grasped by the user of the tool in order to guide the drill shaft 10 and its associated collet member 20 in a straight line coaxially with the centerline of the borehole 34. Once the face cap is removed, the air-jet valve 38 can then be removed by means of a conventional socket designed for that purpose, much like an air-pressure valve is removed from a valve stem of an inner tube for a tire.

FIG. 3 shows the valve removed and the tool surrounded by the holder 30 placed against the face of the carburetor plate. As shown, the enlarged portion of the drill bit shank 12 extends beyond the expansion flange portion 22 of the collet member, and when the shaft 10 is moved rearwardly (to the left in the drawings) by means of turning bolt 34 (as explained above), the flange 22 is caused to expand owing to the slits 26 therein, thus causing the lip portion 26 to bear against the rear edge of the seal plug 40. Further leftward movement of the drill shaft 10 by means of continued turning of the bolt 34 against the end of the threaded portion 28 of the collet member 20 causes the seal plug to be pulled into the cavity 31 provided in the holder 30. In this way the seal plug 40 is quickly and efficiently removed from the borehole 36 of the carburetor baseplate 34 without inflicting any damage on the baseplate or in the borehole. Once the seal plugs 40 (only one is shown for purposes of illustration) are removed, the carburetor can then be rebuilt with either new or adjusted air-jet valves (among other changes) and new seal plugs can then be installed into the boreholes of the baseplate of the rebuilt carburetor.

Figure 4:
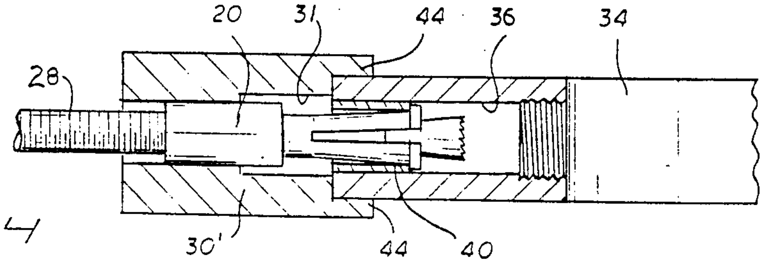
FIG. 4 is schematic cross-sectional view of a further embodiment of the tool according to the invention.

In FIG. 4 a further embodiment is shown in which the holder member 30′ is generally larger than the holder member shown in FIGS. 1–3 and is provided with a pair of opposed projections 44 which between them receive a portion of the baseplate 34, as shown. In this way the holder member 30′ is rigidly secured to the baseplate and is not subject to being jarred by the user's hand, as might be the case with the holder shown in FIGS. 1–3.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A tool for removing a hollow seal plug having a face cap from the end of a borehole for an air-jet valve in a carburetor baseplate, comprising a drill bit means having a cutting face thereon for removing said face cap and said seal plug, expansion means separate from said drill bit means for engaging a portion of said seal plug within said borehole, and camming means on said drill bit means separate and opposite from said cutting face for engaging and expanding said expansion means to thereby remove said seal plug from said borehole.

2. A tool for removing a hollow seal plug having a face cap from the end of a borehole for an air-jet valve in a carburetor baseplate, comprising a shaft member having a drill bit means disposed at one end thereof for removing said face cap of said seal plug, a collet member concentric with said shaft member and having a pliable rim portion at one end thereof for being inserted through said seal plug once said face cap is removed by said drill bit means, means associated with said drill bit means for expanding said rim portion of said collet member to a diameter equal to the diameter of said borehole for said air-jet valve after said collet member is inserted through said seal plug, a drill guide member having a central bore therein for receiving said collet member, said collet member and said shaft member being freely rotatable within said drill guide member, means on said shaft member coacting with said collet member for axially moving said shaft member with respect to said collet member for actuating said expansion means connected with said drill bit means, and means on said collet member coacting with said holder member for axially moving said collet member with respect to said holder member and said carburetor baseplate.

3. The tool according to claim 2, wherein said expanding means comprises a frusto-conical portion at said one end of said shaft member.

4. The tool according to claim 3, wherein said drill bit means comprises a flat drill face on said frusto-conical portion of said one end of said shaft member.

5. The tool according to claim 2, wherein said pliable rim portion on said end portion of said collet member comprises a plurality of splits coaxially aligned with the longitudinal axis of said collet member and further comprising a lip portion defining the outer end portion of said collet member.

6. The tool according to claim 2, wherein said drill guide member further comprises means for securing said guide member to said carburetor baseplate.

7. A tool for removing a hollow seal plug having a face cap from the end of a borehole for an air-jet valve in a carburetor baseplate, comprising a shaft member having a drill bit means disposed at one end thereof for removing said face cap of said seal plug, a collet member concentric with said shaft member and having a pliable rim portion at one end thereof for being inserted through said seal plug once said face cap is removed by said drill bit means, means associated with said drill bit means for expanding said rim portion of said collet member to a diameter equal to the diameter of said borehole for said air-jet valve after said collet member is inserted through said seal plug, and a drill guide member having a central bore therein for receiving said collet member, said collet member and said shaft member being freely rotatable with said drill guide member.

* * * * *